United States Patent [19]

Templeton et al.

[11] 3,792,457
[45] Feb. 12, 1974

[54] DETECTION DEVICE FOR INDICATING SHORT CIRCUITS IN ELECTROLYTIC CELLS

[75] Inventors: Frederick E. Templeton; William M. Tuddenham; Veloy H. Butterfield, Jr.; Barton F. Shipley, all of Salt Lake City, Utah

[73] Assignee: Kennecott Copper Corporation, New York, N.Y.

[22] Filed: Jan. 5, 1972

[21] Appl. No.: 215,508

[52] U.S. Cl. ............................ 340/253 A, 324/43 R
[51] Int. Cl. ............................................ G08b 21/00
[58] Field of Search 340/253 A, 253 R, 249, 253 F, 340/248; 324/43 R, 52, 37 R, 61 P, 54

[56] References Cited
UNITED STATES PATENTS

| 2,546,732 | 3/1951 | Edgar | 324/54 |
| 2,980,897 | 4/1961 | Meszaros | 340/248 B |
| 2,698,921 | 1/1955 | Wharton | 324/52 |
| 3,525,932 | 8/1970 | Flynn | 324/43 R |
| 3,397,348 | 8/1968 | Hoeppel | 340/253 R X |
| 2,748,372 | 5/1956 | Bunds, Jr. | 340/239 R X |
| 3,559,199 | 1/1971 | Schafer | 340/253 A |

Primary Examiner—John W. Caldwell
Assistant Examiner—Daniel Myer
Attorney, Agent, or Firm—Philip A. Mallinckrodt

[57] ABSTRACT

An electrical unit for sensing a steady magnetic field intensity produced by the flow of direct current is mounted in a carriage a fixed distance from the running surface of the carriage and is electrically connected in circuit with indicating means, which may be visual means, such as a light, or an audible alarm or both, energized in response to the sensing of a magnetic field of intensity greater than is produced by electrical current flow of up to a predetermined normal maximum amperage. The carriage is preferably of sled formation adapted to be pushed or pulled across a multitude of electrode suspension bars arranged in series along electrolytic cells in an electrolytic tank house, which bars serve to conduct current to the electrodes. The sensing unit is advantageously a magnetodiode, but may be any one of a number of possible alternatives, e.g. reed relays, electrically connected in suitable control circuitry.

12 Claims, 5 Drawing Figures

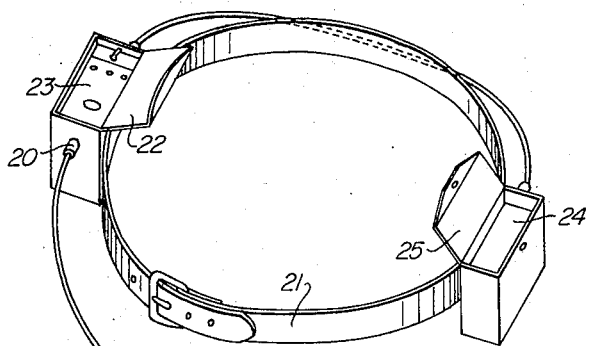
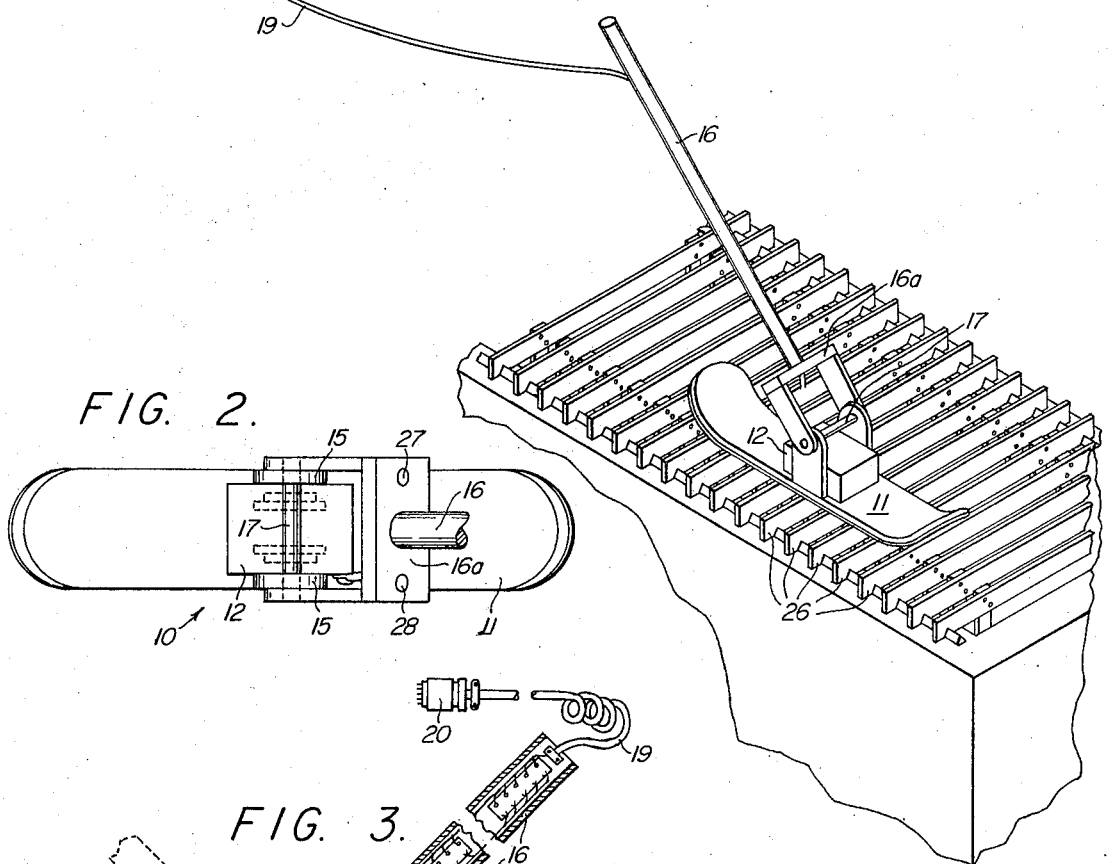
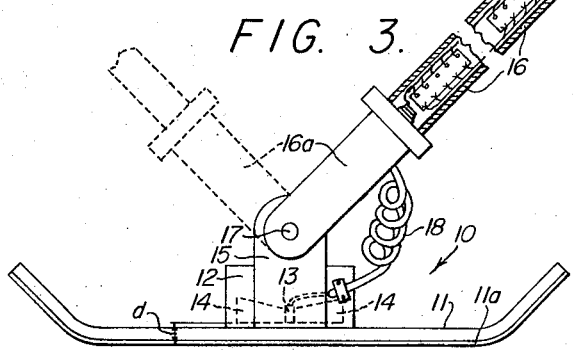
FIG. 1.
FIG. 2.
FIG. 3.

DETECTION DEVICE FOR INDICATING SHORT CIRCUITS IN ELECTROLYTIC CELLS

BACKGROUND OF THE INVENTION

1. Field

The invention is in the field of devices utilized to detect excessive current flows between anode and cathode electrodes of pairs of such electrodes in an electrolytic cell, so as to indicate the existence of electrical short circuits.

2. State of the Art

Electrolytic cells are commonly utilized in great number in so-called "tank houses" for a variety of purposes, among them being the electrorefining or the electrowinning of various metals, such as copper. It has been customary to test for the existence of electrical short circuits between anode and cathode electrodes of pairs of such electrodes in such electrolytic cells by having a workman walk back and forth on walk-ways provided above and along the cells while holding the compass-carrying lower end of a probe immediately above the series of conductor bars that serve to suspend the electrodes in liquid electrolyte within the cell tanks. Excessive displacement of the compass needle is indicative of an electrical short circuit, but it is difficult to make any exact determination because of the tendency for the lower end of the probe to deviate from a constant level and because proper interpretation of the compass reading depends upon the skill of the workman using the probe.

SUMMARY OF THE INVENTION

In accordance with the present invention, individual vagaries are eliminated and highly accurate indications of electrical short circuit conditions are given positively by mounting a sensing unit for steady magnetic field intensity in a carriage, preferably of sled formation, at a fixed distance above the running surface of the carriage, and by electrically connecting such unit in circuit with one or more indicators of excessive field intensity, e.g. a light, an audible alarm, etc. The carriage may be provided with an elongate handle enabling a workman to use it as he would the usual probe, except for the important difference that the carriage spans a number of the suspension bars at a time, riding upon them to maintain the sensing unit at a fixed level relative thereto. The electrical circuitry and power supply for the sensing unit may be carried by the workman on a belt around his waist, or may be built into the carriage, depending upon the type of sensing unit employed and other considerations. It is preferred and a feature of the invention to utilize either a commercially available magnetodiode as the sensing unit or a special arrangement of reed relays.

THE DRAWINGS

Specific embodiments constituting the best mode presently contemplated for carrying out the invention are illustrated in the accompanying drawings, in which:

FIG. 1 is a fragmentary pictorial view, somewhat schematic in character, showing a portion of an electrolytic cell and suspended cathode electrodes as well as a probe in accordance with the invention, the probe having a sled-type carriage with a magnetodiode sensing unit connected into electrical circuitry carried by a waist-encircling belt;

FIG. 2, a plan view of the carriage, showing the sensing unit and flux concentrator therefor by broken lines and including the probe handle only fragmentarily;

FIG. 3, a side elevation of the carriage as shown in FIG. 2, but including the upper end portion of the probe handle and an electrical cord provided with a plug-in facility for the belt-carried items;

FIG. 4, a wiring diagram of electrical circuitry advantageously utilized for the device of FIGS. 1–3; and FIG. 5, a wiring diagram of electrical circuitry advantageously utilized when reed relays are employed for the sensing unit of the device.

DETAILED DESCRIPTION OF THE ILLUSTRATED EMBODIMENTS

Figures 4, 5:
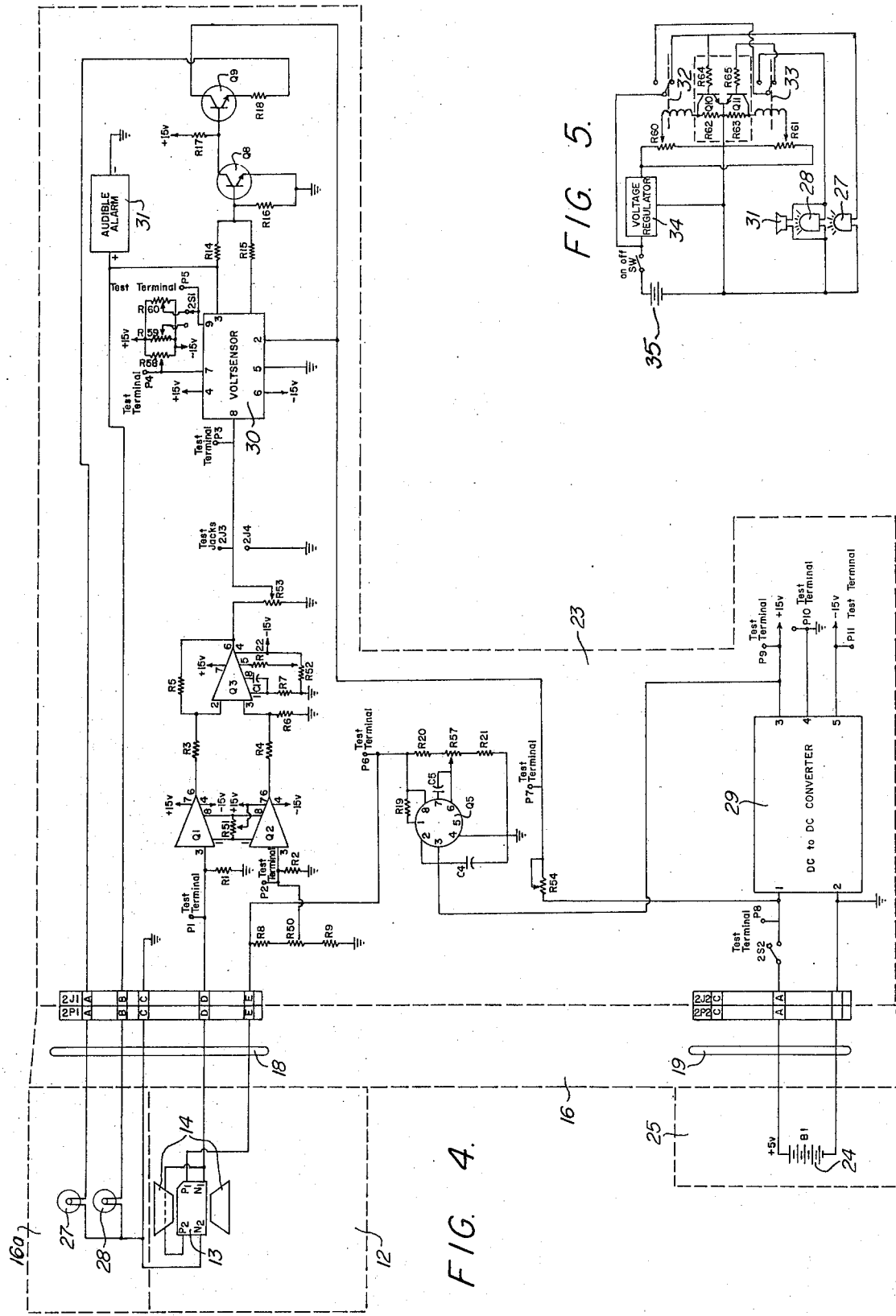

In the form illustrated in FIGS. 1–4, the device of the invention comprises a carriage 10 of sled formation including a runner 11 and housing 12 for a sensing unit 13, FIG. 3, and flux concentrators 14 located at opposite sides of unit 13, as indicated. Standards 15, respectively, fixed to the top of runner 11 at opposite sides of housing 12 serve as mounts for the clevised lower end 16a of an elongate hollow handle 16, a pivot pin 17 securing the clevis 16a in the standards so handle 16 can be swung toward one end or the other of the runner for change of direction of movement without bodily turning the carriage around. For this purpose, runner 11 has both of its ends upturned as shown.

Electrical conductors encased in a lower cord 18 enter the lower end of handle 16 from electrical connection with sensing unit 13, which in this instance is a magnetodiode, continue upwardly through the interior of handle 16, and emerge in an upper cord 19 for electrical connection, as by a plug 20, with electrical circuitry in a box 21, FIG. 1, carried in a pouch 22 attached to a belt 23 adapted to encircle the waist of a workman in an electrolytic tankhouse. Power is supplied to the circuitry in box 21 and to sensing unit 13 by an electrical storage battery 24 carried in a pouch 25 also attached to belt 23.

Sensing unit 13 is secured in fixed position within housing 12 by any suitable means at a predetermined distance, see $d$, FIG. 3, from the running surface of the carriage, i.e. from the underside 11a of runner 11. Thus, when a workman wearing belt 23 and pushing carriage 10 across a multitude of cathode suspension bars 26, FIG. 1, arranged in series along an electrolytic cell 27 in an electrolytic tankhouse, slides runner 11 along the series in the sequential traversal of the bars 26, sensing unit 13 remains constantly at a predetermined fixed level above such bars 26.

If reed relays or some other electrical alternatives are employed for the sensing unit, the same important consideration of mounting them at a fixed predetermined distance above the underside 11a of runner 11 applies.

The purpose of the sensing unit is to measure intensity of the magnetic field surrounding each suspension bar 26 as the device is pushed or pulled along the series of bars above a cell 27 in the electrolytic tankhouse. Intensity of magnetic field is directly proportional to the amperage of the electrical current flowing through the bars. Thus, when there is an electrical short circuit for one reason or another that should be corrected, increase in intensity of magnetic field above a normal maximum results from the increase in current flow due to the short circuit conditions. For example, with normal current within a range of somewhat below and somewhat above 400 amperes, a short circuit condition could result in current ranging from about 600 to 1,000 or more amperes, depending upon the severity of the short. Magnetic field intensity would be a direct measure of this highly undesirable increased current flow, and the device of the invention is designed to indicate such an undesirable condition by means of a visual or an audible signal or both.

As illustrated, indicator lights 27 and 28, FIG. 2, for normal current flow and for excessive current flow, respectively, serve to provide visual signals, and an alarm (see "Sonalert" 31, FIG. 4) is either associated with the electrical circuitry in box 21 or is positioned along with the sensing device in housing 12 to provide an audible signal warning of excessive current flow.

Considering now the electrical nature and operation of the device of FIGS. 1–4, it is noted that a magnetodiode is sensitive to changes in magnetic field intensity from the standpoint of impedance and is commercially obtainable from Sony Company, Tokyo, Japan. Such a diode is designated 13 in the wiring diagram of FIG. 4.

In the specific circuitry shown in FIG. 4, battery 24 supplies direct current to a DC to DC converter 29 whose higher voltage is used to power several integrated circuits. Q5 is a voltage regulator in the form of an integrated circuit, e.g. manufactured by National Semi-Conductor Co. under the designation LM305. It limits the +15 output from converter 29 to +6 volts. Capacitors C4 and C5 are used for stabilization. Resistance R19 limits the output current, and resistances R20, R21, and R57 adjust the output voltage to +6 volts. Resistance R54 adjusts the unregulated B+ voltage applied to a voltsensor 30, which may be a commercially available unit designated 552 by its manufacturer, California Electronic Manufacturing Co., Inc. It similarly adjusts the voltage applied to indicator lights 27 and 28.

Six volts of regulated direct current are applied across the magnetodiode 13. The output voltage of such magnetodiode varies in the neighborhood of +3 volts, depending upon the strength and direction of the magnetic field caused by the current in the respective suspension bars 26. This output signal voltage is fed through a high input impedance, voltage follower Q1 with near unity gain.

Resistances R8, R9, and R50 make up a voltage divider enabling selection of a regulated direct current at approximately +3 volts, which is fed through a similar voltage follower Q2. The voltage followers Q1 and Q2 are integrated circuits, e.g. National Semi-Conductor Co. LM302. Resistances R1 and R2 stabilize the inputs of Q1 and Q2. Resistance R51 is adjusted to compensate for input offset voltage between Q1 and Q2.

Voltage followers Q1 and Q2 both feed a circuit difference amplifier Q3, e.g. a National Semi-Conductor Co. LM301A. Amplifier Q3 has a voltage gain of thirty in this instance, which is set by resistances R3, R4, R5, and R6. Resistances R7, R22, R55 and capacitor C1 are used for stabilization and adjustment of input offset voltage. Resistance R50 is adjusted until the output voltage of amplifier Q3, as measured at test point 2J3, is zero when no magnetic field is present at magnetodiode 13. Resistance R53 adjusts the output voltage of amplifier Q3, which is fed to the input of voltsensor 30. The output voltage of amplifier Q3 varies in direct proportion to the magnitude of the magnetic field sensed by magnetodiode 13. The magnetic field strength varies directly with the magnitude of the current in the respective suspension bars 26 such current being DC.

Voltsensor 30 is a dual setpoint, dual output, voltage comparator. The setpoints are determined by applying regulated voltages, derived by resistances R58, R59, R60, to manufacturer-designated terminals 7 and 9 of voltsensor 30 for low and high setpoints, respectively. When the input voltage to terminal 8 is less than the voltage to terminal 7, an output voltage is present at terminal 1. When the input voltage to terminal 8 is greater than the voltage to terminal 9, output voltage appears at terminal 3. When the input voltage is between the voltages set on terminals 7 and 9, neither terminal 1 nor 3 is energized.

Resistance R58 is adjusted to a predetermined lower limit of suspension bar current regarded as "normal." Switch 2S1 selects resistance R59 or R60, either of which determines the upper limit of suspension bar current regarded as "normal." This allows calibrating the instrument for two short circuit current levels. Suspension bar current greater than the selected "normal" level energizes terminal 3, which causes short circuit indicator light 28 to go on and also activates an audio alarm 31, e.g. a "Sonalert" SC628.

A NOR logic circuit, comprising transistors Q8 and Q9 and resistances R14, R15, R16, R17, and R18, energizes the "normal" indicator light 27 whenever both terminals 1 and 3 are energized. This occurs when the input voltage to terminal 8 is in the "normal" voltage range as set at terminals 7 and 9.

As previously mentioned, magnetodiode 13 is advantageously surrounded by a flux concentrator 14, that may be machined from a high permeability, nickel-iron alloy, e.g. one produced by Carpenter Technology Corp., Philadelphia, Penn., as 49 FM CG Unannealed. This magnetically soft metal is approximately 50 percent iron and 50 percent nickel and exhibits very low magnetic retentivity. As indicated, it is preferably machined into two conical pieces, which concentrate the magnetic flux lines for passage through the magnetodiode, thereby providing magnetic amplification.

The materials used for the carriage 10 should be corrosion resistant and magnetically neutral, e.g. polyvinylchloride plastic and non-magnetic stainless steel. Where aluminum is used, it is preferred that it be coated with an epoxy paint to prevent corrosion. Magnetodiode 13 and flux cncentrator 14 are preferably encapsulated in an acid resistant, electronic potting compound.

Although the described circuitry makes no provision for indicating lower than normal current flow between electrode pairs, this is often desirable and can be provided for in a generally similar manner which will be apparent from the foregoing.

Other sensing means than a magnetodiode can be utilized with appropriate circuitry. Thus, as previously indicated, reed relays can be employed. Preferred circuitry providing both high and low current level indications is illustrated in FIG. 5. In this arrangement, the reed relays 32 and 33 and all circuit components are conveniently placed in housing 12, FIG. 3, and protectively encapsulated therein by an elastic potting material to reduce sensitivity to physical shocks during operation. Since no electrical conductors need pass through the hollow handle 16, such handle is conveniently used to contain a battery power supply 35 preferably yielding a voltage of between 16 and 22 volts.

Power is fed into a voltage regulator 35, so that a constant voltage is supplied to reed relays 32 and 33. Such regulator can be any of those commercially available, e.g. a National Semi-Conductor Co. LM309 or LM723 set for an output of 5 volts DC. Regulator output is connected to resistances R60 and R61, which are used to set the bias on reed relays 32 and 33, respectively, thus determining the set points. Relay 32 is for low level current; relay 33 is for high level current. If more levels are desired, a reed relay will have to be added for each level.

Resistances R62 and R63 are connected in series with reed relays 32 and 33 to narrow the magnetic field strength ranges required to operate and to release these relays.

Resistances R64 and R65 are provided to limit the current supplied to the base of transistors Q10 and Q11, respectively. As voltage is applied to R64 and R65, transisters Q10 and Q11 will switch on and will short out resistances R62 and R63. As these resistances are turned on and off, the bias on reed relays 32 and 33 will change. For example, with a lower than normal magnetic field, voltage from batteries 35 is supplied to a low current indicator through reed relay 32 as well as to R64, which turns on transistor Q10 and shorts out resistance R62. Reed relay 32 is thus connected across the total voltage being supplied through R10.

Indicator light 27 may in this instance be used as the low current indicator, while indicator light 28 and audio alarm 31 may be used as the high current indicator alerting to a short circuit condition.

When the magnetic field is increased to the point that reed relay 32 is actuated, the voltage is removed from resistance R64 and thus from transistor Q10. Resistance R62 is then in series with reed relay 32. Accordingly, the voltage drop across such relay is decreased. The value of resistance R62 is chosen so the voltage across reed relay 32 plus the magnetic field is enough to hold such relay in an actuated position, yet such that a slight drop in the magnetic field strength will release the relay.

Resistance R65, transistor Q11, and resistance R63 have a similar effect on reed relay 32 when intensity of the magnetic field increases beyond a predetermined maximum, thereby energizing signal light 28 and alarm 31. All the electronic components with the reed relay sensors can be mounted in the sled with the batteries located in the handle.

The reed relays may be of any suitable type, for example those sold commercially by Electronic Applications Co.

Whereas this invention is here illustrated and described with respect to certain preferred forms thereof, it is to be understood that many variations are possible without departing from the inventive concepts particularly pointed out in the claims.

We claim:

1. A detection device for indicating short circuits in electrolytic cells, comprising a carriage having a running surface adapted to seat upon and travel across a series of electrode suspension bars conducting electrical current to electrode pairs in an electrolytic cell; a sensing unit responsive to steady magnetic fields surrounding the respective suspension bars as produced by direct current flow through said suspension bars, said sensing unit being secured in said carriage at a fixed level above said running surface thereof; and electrical control circuitry with which said sensing unit is electrically connected, said circuitry including signaling means and calibrating means and being arranged to actuate said signaling means when the intensity of magnetic field to which said sensing unit is exposed exceeds a predetermined level established by said calibrating means.

2. A detection device in accordance with claim 1, wherein the carriage is of sled runner formation.

3. A detection device in accordance with claim 1, wherein the sensing unit is a magnetodiode.

4. A detection device in accordance with claim 3, wherein flux concentrator means are associated with the magnetodiode.

5. A detection device in accordance with claim 4, wherein the flux concentrator means comprise a pair of flux concentrators at opposite sides, respectively, of the magnetodiode, each tapering toward the magnetodiode.

6. A detection device in accordance with claim 1, wherein the sensing unit comprises reed relay means.

7. A detection device in accordance with claim 6, wherein there are at least two reed relays, the control circuitry, including respective resistances arranged to bias said relays so they will be actuated at respective predetermined levels of magnetic field intensity.

8. A detection device in accordance with claim 1, wherein the signaling means includes a set of two electric lights mounted on the carriage, and the control circuitry is arranged to energize one of said lights when a magnetic field being sensed does not exceed a predetermined normal intensity and to energize the other of said lights when a magnetic field being sensed does exceed said predetermined normal intensity.

9. A detection device in accordance with claim 6, wherein the signaling means also includes an audible alarm.

10. A detection device in accordance with claim 1, wherein the carriage includes a handle for manual manipulation of said carriage.

11. A detection device in accordance with claim 1, wherein the signaling means in the control circuitry includes a signaling means indicative of normal magnetic field intensity and a signaling means indicative of abnormal field intensity, and wherein the control circuitry is arranged to actuate the normal signaling means during a predetermined range of magnetic field intensity to which the sensing means is exposed and to actuate the abnormal signaling means when said range of magnetic field intensity is exceeded.

12. A detection device in accordance with claim 11, wherein the control circuitry includes means for adjusting the range of magnetic field intensity regarded as normal at any given time.

* * * * *